United States Patent Office 3,826,657
Patented July 30, 1974

3,826,657
SURFACE-COATING COMPOSITIONS THAT CONTAIN $N^1$-(SUBSTITUTED ETHYL)INDAZOLES
Pasquale P. Minieri, Woodside, N.Y., assignor to Tenneco Chemicals, Inc.
No Drawing. Application Feb. 7, 1972, Ser. No. 224,294, which is a continuation-in-part of applications Ser. No. 689,812, Dec. 12, 1967, now Patent No. 3,641,050, and Ser. No. 141,999, May 10 1971, now Patent No. 3,741,-979. Divided and this application Apr. 20, 1973, Ser. No. 353,078
Int. Cl. C09d 5/14
U.S. Cl. 106—17
11 Claims

ABSTRACT OF THE DISCLOSURE

Compounds that have the structural formula

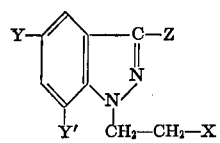

wherein X represents halogen, —SCN, —OR, or —N=R'; Y and Y' each represents hydrogen, halogen, lower alkyl, nitro, amino, acoylamino, aroylamino, (halobenzylidene) amino, or —N=R'; Z represents hydrogen, halogen, acoylamino, or —N=R'; R represents hydrogen, alkyl having 1 to 12 carbon atoms, haloalkyl having 1 to 4 carbon atoms, phenyl, or substituted phenyl wherein the substituent is halogen, hydroxyl, alkyl, or nitro; and R' represents an alkylene group having 1 to 8 carbon atoms, are used to protect surface-coating compositions from deterioration resulting from attack by bacteria and fungi. Illustrative of these $N^1$-(substituted ethyl)indazoles is $N^1$-(2-hydroxyethyl)-5-nitro-indazole.

---

This is a division of my copending application Ser. No. 224,294, which was filed on Feb. 7, 1972 and which is a continuation-in-part of copending applications Ser. No. 689,812, which was filed on Dec. 12, 1967, now U.S. Pat. No. 3,641,050 and Ser. No. 141,999, which was filed on May 10, 1971, now U.S. Pat. No. 3,741,979.

This invention relates to surface-coating compositions that have improved resistance to deterioration resulting from attack by fungi, bacteria, and other microorganisms. More particularly, it relates to surface-coating compositions that contain biocidal amounts of $N^1$-(substituted ethyl)indazoles.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi and bacteria. Others, for example, aqueous dispersions of water-insoluble synthetic linear polymers, generally contain as plasticizers and thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while others undergo sulfide staining and still others hydrolyze in alkaline aqueous paint systems or separate from the applied coating by migration, volatilization, or leaching once the coating has been spread in a thin layer over the surface to be protected.

This invention relates to biocides that are of particular value in surface-coating compositions. These biocides, which are thoroughly compatible with the resinous binders that commonly are used in surface-coating compositions and which are resistant to sulfide staining, provide excellent and prolonged resistance to deterioration resulting from attack by fungi and other microorganisms without adversely affecting the color, pH, viscosity, and other physical properties of the surface-coating compositions.

The biocidal compounds that are used in the surface-coating compositions of this invention are $N^1$-(substituted ethyl)-indazoles. These compounds may be represented by the structural formula

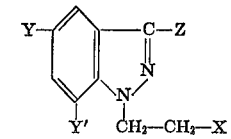

wherein X represents chlorine, bromine, fluorine, iodine, thiocyanato, —OR, or —N=R'; Y and Y' each represents hydrogen, chlorine, bromine, fluorine, iodine, alkyl having 1 to 4 carbon atoms, nitro, amino, acoylamino, aroylamino, (halobenzylidene)-amino, or —N=R'; Z represents hydrogen, chlorine, bromine, fluorine, iodine, acoylamino, or —N=R'; R represents hydrogen, alkyl having 1 to 12 carbon atoms, chloroalkyl having 1 to 4 carbon atoms, bromoalkyl having 1 to 4 carbon atoms, fluoroalkyl having 1 to 4 carbon atoms, iodoalkyl having 1 to 4 carbon atoms, phenyl, chlorophenyl, bromophenyl, fluorophenyl, iodophenyl, hydroxyphenyl, alkylphenyl, or nitrophenyl; and R' represents an alkylene group having 1 to 8 carbon atoms.

Illustrative of the compounds of this invention are the following:

$N^1$-(2-hydroxyethyl)-3-chloroindazole;
$N^1$-(2-hydroxyethyl)-3-chloro-5-nitroindazole;
$N^1$-(2-hydroxyethyl)-3,5-dibromoindazole;
$N^1$-(2-hydroxyethyl)-5,7-dichloroindazole;
$N^1$-(2-bromoethyl)-5,7-dibromoindazole;
$N^1$-(2-fluoroethyl)-3-methyleneiminoindazole;
$N^1$-(2-iodoethyl)-3-acetaminoindazole;
$N^1$-(2-thiocyanatoethyl)-5-methyleneiminoindazole;
$N^1$-(2-thiocyanatoethyl)-5-methyl-7-nitroindazole;
$N^1$-(2-methyleneiminoethyl)-5-acetaminoindazole;
$N^1$-(2-piperidinoethyl)-5-(3,4-dichlorobenzylidene) aminoindazole;
$N^1$-(2-methoxyethyl)-5-ethyleneiminoindazole;
$N^1$-(2-chloroethoxyethyl)-5-piperidinoindazole;
$N^1$-(2-bromobutoxyethyl)indazole;
$N^1$-(2-phenoxyethyl)-5-aminoindazole;
$N^1$-[2-(m-nitrophenoxy)ethyl]-3-chloroindazole;
$N^1$-[2-(p-tert.butylphenoxy)ethyl]-5-methyl-7-chloroindazole;
$N^1$-(2-butoxyethyl)-5-benzaminoindazole;
$N^1$-[2-(o-hydroxyphenoxy)ethyl]-3,5-dichloroindazole;

and the like.

The most effective of these compounds in surface-coating compositions are those in which X represents hydroxyl or halogen; Y and Y' each represents hydrogen, halogen or nitro; and Z represents hydrogen or halogen. The following are examples of these preferred compounds:

$N^1$-(2-hydroxyethyl)indazole;
$N^1$-(2-hydroxyethyl)-3-chloro-5-nitroindazole;
$N^1$-(2-hydroxyethyl)-5,7-dichloroindazole;
$N^1$-(2-hydroxyethyl)-5,7-dibromoindazole;

$N^1$-(2-hydroxyethyl)-3,5,7-trichloroindazole;
$N^1$-(2-chloroethyl)-3-chloroindazole;
$N^1$-(2-chloroethyl)-5-chloroindazole;
$N^1$-(2-bromoethyl)-3,5,7-tribromoindazole;
$N^1$-(2-fluoroethyl)-5,7-difluoroindazole;
$N^1$-(2-chloroethyl)-5,7-dichloroindazole;
$N^1$-(2-iodoethyl)-5,7-diiodoindazole;
$N^1$-(2-chloroethyl)-5-nitroindazole; and
$N^1$-(2-chloroethyl)-3-chloro-5-nitroindazole.

The $N^1$-(substituted ethyl)indazoles of this invention may be prepared by any suitable and convenient procedure. For example, they may be prepared by heating the appropriate substituted indazole with a compound that will react with it to form the desired $N^1$-(substituted ethyl)indazole. Thus, the $N^1$-(2-hydroxyethyl)indazoles may be prepared by heating a substituted indazole with ethylene carbonate. The $N^1$-(2-chloroethyl) compounds are formed by heating the corresponding $N^1$-(2-hydroxyethyl) compounds with thionyl chloride, and the $N^1$-(2-thiocyanatoethyl) compounds are prepared by heating the $N^1$-(2-chloroethyl) compounds with potassium thiocyanate. The reactions are generally carried out in a solvent such as benzene, toluene, xylene, acetone, pyridine, ethanol, or ethylene dichloride, at the reflux temperature of the reaction mixture.

The $N^1$-(substituted ethyl)indazoles can be used to impart fungal and bacterial resistance to a wide variety of surface-coating compositions including both organic solvent-based and water-based systems.

In a preferred embodiment of the invention, the $N^1$-(substituted ethyl) indazoles are used as preservatives for surface-coating compositions that are aqueous dispersions that contain about 10 percent to 60 percent by weight of a water-insoluble linear addition polymer and/or an oleoresinous binder. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinyl acetate or vinylidene chloride; polyethylene; polyisobutylene; polystyrene; copolymers of styrene with maleic anhydride or butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; and mixtures thereof. Suitable oleoresinous binders include drying oils, such as linseed oil, tung oil, soybean oil, dehydrated castor oil, safflower oil, or fish oil, bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anhydride, and fatty acids; and mixtures thereof. The addition to such surface-coating compositions of as little as 0.10 percent by weight of one or more of the biocidal compounds of this invention will bring about an appreciable improvement in the resistance of the composition to attack by bacteria. Three percent or more of the biocidal compounds can be used, but these larger amounts ordinarily do not provide further improvement in the properties of the surface-coating compositions and for this reason are not usually used. It is generally preferred to incorporate 0.2 percent to 0.4 percent by weight of the biocidal compounds into aqueous surface-coating compositions to protect them from attack by bacteria.

In another preferred embodiment of this invention, the $N^1$-(substituted ethyl)indazoles are used to impart fungal and bacterial resistance to dried films of protective or decorative coating compositions that have been applied to a surface. When they are added in the amount of about 0.1 percent to about 3 percent, and preferably 0.5 percent to 2 percent, based on the weight of the surface-coating composition, these biocidal compounds which are thoroughly compatible with the resinous binders that are commonly used in surface-coating compositions and which are resistant to sulfide staining, provide excellent and prolonged resistance to deterioration resulting from attack by fungi, bacteria, and other microorganisms without adversely affecting the color, odor, viscosity, and other physical properties of the surface-coating compositions or of the dried films of these compositions.

Both organic solvent-based and water-based coating systems can be preserved by incorporating into them the biocidal compounds of this invention. These compounds are of particular value as biocides in coatings that contain as their resinous binder an oleoresinous binder and/or a water-insoluble synthetic linear addition polymer as hereinbefore defined.

In addition to the resinous binder and the $N^1$-(substituted ethyl)indazole, the surface-coating compositions of this invention may contain various auxiliary materials, such as pigments, extenders, solvents, dyes, defoaming agents, driers, emulsifying agents, dispersing agents, plasticizers, and the like in the amounts ordinarily used for these purposes.

The $N^1$-(substituted ethyl)indazoles may be incorporated into the surface-coating composition by any convenient procedure. For example, they can be combined with pigments and various other components to form a pigment phase that is then mixed with the resinous binder and water or an organic solvent to form the surface-coating composition. Alternatively, they can be added to a composition that contains the resinous binder, pigment, and water or organic solvent. The biocidal compound can be added as such to the other components of the surface-coating composition, or they can be added as a solution in an alcohol, ether, ketone or other solvent.

The invention is further illustrated by the following examples.

Example 1

A mixture of 18.1 grams (0.1 mole) of 3-chloroindazole, 7.9 grams (0.127 mole) of ethylene carbonate, and 0.11 gram of anhydrous potassium carbonate was heated at 140°–150° C. for 5 hours and then allowed to stand overnight at room temperature. The solidified reaction mixture was heated in 40 ml. of benzene until it had dissolved, and the resulting solution was cooled and filtered. After washing with benzene and drying, 7.0 grams of $N^1$-(2-hydroxyethyl)-3-chloroindazole was obtained. This compound melted at 113°–126° C. and contained 53.69 percent C, 3.66 percent H, and 16.15 percent N (calculated, 55.2 percent C, 4.6 percent H, and 14.2 percent N).

Example 2

The procedure described in Example 1 was repeated using 5-chloroindazole in place of 3-chloroindazole. The $N^1$-(2-hydroxyethyl-5-chloroindazole obtained was an oil that contained 52.8 percent C, 4.5 percent H, 13.9 percent N, and 18.0 percent Cl (calculated, 55.2 percent C, 4.6 percent H, 14.2 percent N, and 18.0 percent Cl).

Example 3

The procedure described in Example 1 was repeated using 3-chloro-5-nitroindazole in place of 3-chloroindazole. The $N^1$-(2-hydroxyethyl)-3-chloro-5-nitroindazole obtained melted at 100°–113° C. and contained 46.2 percent C, 3.8 percent H, 19.1 percent N, and 12.6 percent Cl (calculated, 44.7 percent C, 3.8 percent H, 17.4 percent N, and 14.7 percent Cl).

Examples 4 and 5

The following compounds were prepared by the procedure described in Example 1:

|  |  |  | Analysis, percent |  |  |  |  |  |  |  |
|---|---|---|---|---|---|---|---|---|---|---|
|  |  | Melting | Found |  |  |  | Calculated |  |  |  |
| Example number | Compound | point (° C.) | C | H | N | Cl | C | H | N | Cl |
| 4 | $N^1$-(2-hydroxyethyl)-5-nitroindazole | 97–112 | 52.2 | 4.6 | 19.7 | | 52.2 | 4.3 | 21.0 | |
| 5 | $N^1$-(2-hydroxyethyl)-3,5-dichloroindazole | | 46.1 | 2.7 | 12.5 | 31.5 | 46.7 | 3.5 | 12.1 | 30.7 |

Example 6

A. A polyvinyl acetate latex paint was prepared by mixing together the following materials:

| | Parts by Weight |
|---|---|
| Water | 481.5 |
| 25% Aqueous solution of sodium salt of maleic anhydride/diisobutylene copolymer | 24 |
| Potassium pyrophosphate | 3 |
| Long chain fatty acid alkanolamide | 9 |
| Defoamer | 6 |
| Ethylene glycol | 75 |
| 1¼% Aqueous solution of hydroxyethylcellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint testing procedures:
Viscosity: 65 K.U.
Brookfield Viscosity (#4 spindle, 60 r.p.m.): 800 cps.
pH: 7.8
Yellowness Index: 3.0

B. An acrylic latex paint was prepared by mixing together the following materials:

| | Parts by Weight |
|---|---|
| Water | 168 |
| Alkyl aryl ether surfactant | 6 |
| 25% Aqueous solution of sodium salt of maleic anhydride/diisobutylene copolymer | 27 |
| Defoamer | 12 |
| 2% Aqueous solution of hydroxyethylcellulose | 300 |
| Ethylene glycol | 60 |
| Titanium dioxide | 750 |
| Mica (waterground) | 90 |
| Calcium carbonate | 375 |
| Ammonium hydroxide (28%) | 6 |
| Aqueous dispersion containing 46% acrylic ester copolymer (66% ethyl acrylate, 32.5% methyl acrylate, and 1.5% acrylic acid) | 1642 |

This paint had the following properties:
Viscosity: 72 K.U.
Brookfield Viscosity (#3 spindle, 60 r.p.m.): 1250 cps.
pH: 9.2
Yellowness Index: 2.6

C. An exterior house paint was prepared by mixing together the following materials:

| | Parts by Weight |
|---|---|
| Basic Lead Carbonate | 288 |
| Zinc Oxide | 232 |
| Titanium dioxide (rutile) | 149 |
| Talc | 260 |
| Linseed oil | 242 |
| Bodied linseed oil | 114 |
| Mineral Spirits | 114 |
| Antiskinning Agent | 2 |
| Manganese naphthenate (6%) | 2.27 |
| Lead naphthenate (24%) | 11.3 |

Example 7

The paints whose preparation was described in Example 6 were evaluated by means of an agar diffusion assay. In this test agar is inoculated with the test organism, the treated paint is placed in a well cut from the agar, and after incubation at 28° C. and 85–95% relative humidity, the activity of the biocide is measured by zones of inhibition. The biocidal compounds tested and the results obtained are given in the table that follows. In this table
ZO=Zone of inhibition in mm.
O=No zone of inhibition; no growth
Tr=Trace zone of inhibition
__=Not tested
Bacteria:
  A—*Bacillus subtilis*
  B—*Aerobacter aerogenes*
  C—*Pseudomonas aeruginosa*
Fungi:
  D—*Pullularia pullulans*
  E—*Penicillium crustosum*
  F—*Aspergillus niger*

Activity of $N^1$-(2-substituted ethyl)indazoles as biocides in paints

| | | | | Biocidal activity | | | | | |
|---|---|---|---|---|---|---|---|---|---|
| | | Effect on paint | | Bacteria | | | Fungi | | |
| Biocide | Paint | pH | Color | A | B | C | D | E | F |
| Product of—Example 1 | Acrylic | 8.9 | White | 0 | 0 | 0 | 0 | 0 | 0 |
| | PVA | 7.3 | do | 0 | 0 | 0 | Tr | 0 | 0 |
| | Oil | | do | | | | ZO-3 | ZO-6 | ZO-3 |
| Example 2 | Acrylic | 9.2 | Off-white | 0 | 0 | 0 | ZO-2 | ZO-1 | 0 |
| | PVA | 7.6 | Beige | 0 | 0 | 0 | ZO-1 | ZO-1 | Tr |
| | Oil | | Off-white | | | | ZO-2 | Tr | ZO-1 |
| Example 4 | Acrylic | 9.3 | Beige | Tr | 0 | 0 | 0 | Tr | 0 |
| | PVA | 7.1 | do | Tr | 0 | 0 | 0 | 0 | 0 |
| | Oil | | White | | | | 0 | 0 | 0 |
| Example 5 | Acrylic | 8.9 | do | 0 | 0 | 0 | 0 | ZO-3 | 0 |
| | PVA | 7.0 | do | 0 | 0 | 0 | 0 | 0 | 0 |
| | Oil | | do | | | | ZO-1 | ZO-5 | Tr |

What is claimed is:

1. A surface-coating composition that comprises (a) a water-insoluble resinous binder selected from the group consisting of oleoresinous binders, synthetic linear addition polymers obtained by the vinyl polymerization of monoethylenically-unsaturated monomers, and mixtures thereof and (b) about 0.10 percent to 3 percent, based on the weight of said composition, of a biocidal compound having the structural formula

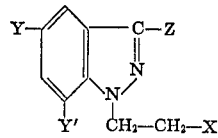

wherein X represents halogen, —OR, —SCN, or —N=R'; Y and Y' each represents hydrogen, halogen, lower alkyl, nitro, amino, acoylamino, aroylamino, (halobenzylidene) amino, or —N=R'; Z represents hydrogen, halogen, acoylamino, or —N=R'; R represents hydrogen, alkyl having 1 to 12 carbon atoms, haloalkyl having 1 to 4 carbon atoms, phenyl, or substituted phenyl wherein the substituent is halogen, hydroxyl, alkyl, or nitro; and R' represents an alkylene group having 1 to 8 carbon atoms.

2. A surface-coating composition as set forth in Claim 1 that contains 0.5 percent to 2 percent, based on the weight of the composition, of the biocidal compound.

3. A surface-coating composition as set forth in Claim 1 wherein the biocidal compound has the structural formula

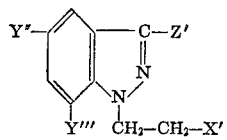

wherein X' represents hydroxyl or halogen; Y'' and Y''' each represents halogen, hydrogen, or nitro; and Z' represents hydrogen or halogen.

4. A surface-coating composition as set forth in Claim 1 wherein the biocidal compound is $N^1$-(2-hydroxyethyl)-5-chloroindazole.

5. A surface-coating composition as set forth in Claim 1 wherein the biocidal compound is $N^1$-(2-hydroxyethyl)-3-chloroindazole.

6. An aqueous surface-coating composition that contains 10 percent to 60 percent by weight of a water-insoluble resinous binder selected from the group consisting of oleoresinous binders, synthetic linear addition polymers obtained by the vinyl polymerization of monethylenically-unsaturated monomers, and mixtures thereof and 0.10 percent to 3.0 percent, based on the weight of said composition, of a biocidal compound having the structural formula

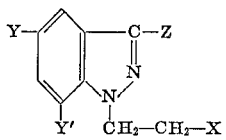

wherein X represents halogen, —OR, —SCN, or —N=R'; Y and Y' each represents hydrogen, halogen, lower alkyl, nitro, amino, acoylamino, aroylamino, (halobenzylidene) amino, or —N=R'; Z represents hydrogen, halogen, acoylamino, or —N=R'; R represents hydrogen, alkyl having 1 to 12 carbon atoms, haloalkyl having 1 to 4 carbon atoms, phenyl, or substituted phenyl wherein the substituent is halogen, hydroxyl, alkyl, or nitro; and R' represents an alkylene group having 1 to 8 carbon atoms.

7. An aqueous surface-coating composition as set forth in Claim 6 that contains 0.2 percent to 0.4 percent by weight of said biocidal compound.

8. The process of controlling the growth of fungi and other microorganisms in a surface-coating composition that contains a water-insoluble resinous binder selected from the group consisting of oleoresinous binders, synthetic linear addition polymers obtained by the vinyl polymerization of monoethylenically-unsaturated monomers, and mixtures thereof that comprises incorporating in said composition about 0.10 percent to 3 percent, based on the weight of said composition, of a biocidal compound having the structural formula

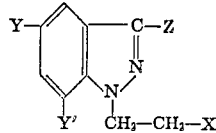

wherein X represents halogen, —OR, —SCN, or —N=R'; Y and Y' each represents hydrogen, halogen, lower alkyl, nitro, amino, acoylamino, aroylamino, (halobenzylidene) amino, or —N=R'; Z represents hydrogen, halogen, acoylamino, or —N=R'; R represents hydrogen, alkyl having 1 to 12 carbon atoms, haloalkyl having 1 to 4 carbon atoms; phenyl, or substituted phenyl wherein the substituent is halogen, hydroxyl, alkyl, or nitro; and R' represents an alkylene group having 1 to 8 carbon atoms.

9. The process of Claim 8 wherein 0.5 percent to 2 percent, based on the weight of the composition, of the biocidal compound is incorporated into the composition.

10. The process for preventing bacteria-caused spoilage in an aqueous surface-coating composition that comprises incorporating in said aqueous composition 0.1 percent to 3.0 percent, based on the weight of said composition, of a biocidal compound having the structural formula

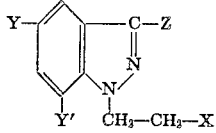

wherein X represents halogen, —OR, —SCN, or —N=R'; Y and Y' each represents hydrogen, halogen, lower alkyl, nitro, amino, acoylamino, aroylamino, (halobenzylidene) amino, or —N=R'; Z represents hydrogen, halogen, acoylamino, or —N=R'; R represents hydrogen, alkyl having 1 to 12 carbon atoms, haloalkyl having 1 to 4 carbon atoms, phenyl, or substituted phenyl wherein the substituent is halogen, hydroxyl, alkyl, or nitro; and R' represents an alkylene group having 1 to 8 carbon atoms.

11. The process of Claim 10 wherein 0.2 percent to 0.4 percent by weight of the biocidal compound is incorporated into the aqueous composition.

References Cited

UNITED STATES PATENTS

| 3,637,736 | 1/1972 | Minieri | 260—310 C |

FOREIGN PATENTS

| 1,568,790 | 4/1969 | France | 260—310 C |
| 1,814,335 | 8/1969 | Germany | 260—310 C |
| 2,003,561 | 7/1970 | Germany | 260—310 C |

OTHER REFERENCES

Auwers et al.: Chem. Abs. 22, 1156 (1928).
Pozharskii et al.: J. Gen. Chem. (U.S.S.R.) pp. 3409–3411 (1964).

ALLAN LIEBERMAN, Primary Examiner
T. DEBENDICTIS, Sr., Assistant Examiner

U.S. Cl. X.R.

106—15 AF, 17, 18; 260—29.6 RB, RW, WB, T, TA, MN, 45.8 N, 85.1, 85.5 N, 86.1 R, 86.3, 86.7, 87.1, 88.7 F, 92.8 A, 94.8, 94.9 R, 310 C